US 9,952,571 B2

(12) United States Patent
Zhang et al.

(10) Patent No.: US 9,952,571 B2
(45) Date of Patent: Apr. 24, 2018

(54) METHOD AND TERMINAL DEVICE FOR CONTROLLING SMART HOME APPLIANCE

(71) Applicant: Xiaomi Inc., Beijing (CN)

(72) Inventors: Pengfei Zhang, Beijing (CN); Yongfeng Xia, Beijing (CN); Yong Chen, Beijing (CN); Xu Zhang, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 420 days.

(21) Appl. No.: 14/642,723

(22) Filed: Mar. 9, 2015

(65) Prior Publication Data

US 2015/0268648 A1    Sep. 24, 2015

Related U.S. Application Data

(63) Continuation of application No. PCT/CN2014/091190, filed on Nov. 14, 2014.

(30) Foreign Application Priority Data

Mar. 24, 2014  (CN) .......................... 2014 1 0112307

(51) Int. Cl.
*G06F 19/00* (2011.01)
*G05B 15/02* (2006.01)
*H04L 12/28* (2006.01)

(52) U.S. Cl.
CPC ............ *G05B 15/02* (2013.01); *H04L 12/282* (2013.01); *G05B 2219/2642* (2013.01); *H04L 2012/2841* (2013.01)

(58) Field of Classification Search
CPC .......... H04N 21/43615; H04N 5/4403; H04N 21/42204; H04N 21/4131;
(Continued)

(56) References Cited

U.S. PATENT DOCUMENTS 5,255,386 A * 10/1993 Prager .................. G06F 9/4446
6,611,537 B1 *  8/2003 Edens ................. H04L 12/2803
                                                            348/E7.05
(Continued)

FOREIGN PATENT DOCUMENTS

KR         20130029662 A1      3/2013

OTHER PUBLICATIONS

Office action from KIPO for KR application 2015-7021518 dated Jul. 10, 2017.
(Continued)

*Primary Examiner* — Darrin Dunn
(74) *Attorney, Agent, or Firm* — Jun He Law Offices P.C.; James J. Zhu (57) ABSTRACT

A method and a terminal device for controlling a smart home appliance are provided in the present disclosure. The method includes: obtaining a current operation instruction; determining whether there is a preset combination instruction corresponding to the current operation instruction; sending at least two operation instructions in the preset combination instruction to a corresponding smart home appliance if there is the preset combination instruction and the preset combination instruction is selected; sending the current operation instruction to the corresponding smart home appliance if there is no preset combination instruction.

19 Claims, 6 Drawing Sheets

(58) Field of Classification Search
CPC ..... H04N 21/43637; H04N 2005/4441; G08C 2201/33; G08C 2201/40; G08C 17/00; G08C 2201/92; G08C 2201/93; G05B 15/02; G05B 2219/2642
See application file for complete search history.

(56) References Cited

U.S. PATENT DOCUMENTS

| | | | |
|---|---|---|---|
| 6,690,392 B1 | 2/2004 | Wugoski | |
| 8,312,495 B2* | 11/2012 | Vanderhoff | G08C 23/04 340/12.22 |
| 8,508,401 B1* | 8/2013 | Patel | H04B 1/202 341/176 |
| 2004/0172621 A1* | 9/2004 | Guillorit | H04N 7/106 717/120 |
| 2005/0154999 A1* | 7/2005 | Wugoski | G06F 3/0481 715/827 |
| 2006/0277580 A1* | 12/2006 | Scheelke | G08C 23/04 725/78 |
| 2007/0064147 A1* | 3/2007 | Kondo | H04N 5/4403 348/383 |
| 2008/0103781 A1* | 5/2008 | Wasson | G10L 17/26 704/277 |
| 2009/0102617 A1* | 4/2009 | Thommes | G05B 15/02 340/12.3 |
| 2010/0156694 A1* | 6/2010 | Rye | G08C 17/02 341/176 |
| 2013/0290001 A1* | 10/2013 | Yun | G10L 15/00 704/275 |
| 2014/0089956 A1* | 3/2014 | Shah | H04N 21/25891 725/14 |
| 2014/0172123 A1* | 6/2014 | Lee | G05B 15/02 700/17 |
| 2014/0245353 A1* | 8/2014 | Raza | H04N 21/4821 725/44 |
| 2014/0267933 A1* | 9/2014 | Young | H04N 21/42203 348/734 |
| 2015/0033139 A1* | 1/2015 | Thiel | G06F 3/0484 715/740 |
| 2015/0058008 A1* | 2/2015 | Tateno | G06Q 30/02 704/235 |
| 2015/0095416 A1* | 4/2015 | Abiri | H04W 4/023 709/204 |
| 2015/0334461 A1* | 11/2015 | Yu | H04N 21/4668 725/14 |
| 2016/0041851 A1* | 2/2016 | Bauerle | G06F 9/524 709/224 |
| 2016/0295267 A1* | 10/2016 | Hu | H04N 21/4108 |
| 2017/0011624 A1* | 1/2017 | Guihot | G08C 17/02 |

OTHER PUBLICATIONS

"Command-line Completion", the Wikipedia, and the free encyclopedia (Feb. 2014), retrieved from https://en.wikipedia.org/wiki/Command-line_completion?oldid=596705732, cited by office action from KIPO for KR application 2015-7021518.

* cited by examiner

METHOD AND TERMINAL DEVICE FOR CONTROLLING SMART HOME APPLIANCE

CROSS REFERENCE TO RELATED APPLICATION

This application is a Continuation of International Application No. PCT/CN2014/091190, with an international filing date of Nov. 14, 2014, which claims the priority of Chinese patent application No. 201410112307.0, filed on Mar. 24, 2014, the entire content of which is incorporated herein by reference.

TECHNICAL FIELD

The present disclosure generally relates to smart TV technical field, and more particularly, to a method and a terminal device for controlling a smart home appliance.

BACKGROUND

A smart TV is a new TV product, which has a full open platform, further equipped with an operating system, which enables a user to free install or uninstall various kinds of application software so as to expand and to upgrade functions constantly. Hence, a rich personalized experience can be brought to the user by the smart TV.

As the smart TV is much more complex than the conventional TV in function, it is also much more difficult and complex to operate the smart TV. If a conventional remote control is used to operate the smart TV, it will be quite inconvenient. Also, similar problems may arise in other smart home appliances such as smart air conditioners and so on.

SUMMARY

In order to solve certain technical problem in the related art, a method and a terminal device for controlling a smart home appliance are provided.

According to a first aspect of the present disclosure, a method for controlling a smart home appliance is provided. The method includes obtaining a current operation instruction; determining whether there is a preset combination instruction corresponding to the current operation instruction, wherein the preset combination instruction includes at least two operation instructions and operation information of the at least two operation instructions, and the operation information at least includes a sequence between adjacent operation instructions and a delay between adjacent operation instructions; sending the at least two operation instructions in the preset combination instruction to a corresponding smart home appliance if there is the preset combination instruction and the preset combination instruction is selected; sending the current operation instruction to the corresponding smart home appliance if there is no preset combination instruction.

According to a second aspect of the present disclosure, a terminal device is provided. The terminal device includes: a processor; a memory configured to store an executable instruction of the processor, wherein the processor is configured to: obtain a current operation instruction; determine whether there is a preset combination instruction corresponding to the current operation instruction, wherein the preset combination instruction includes at least two operation instructions and operation information of the at least two operation instructions, and the operation information at least includes a sequence between adjacent operation instructions and a delay between adjacent operation instructions; send the at least two operation instructions in the preset combination instruction to a corresponding smart home appliance if there is the preset combination instruction and the preset combination instruction is selected; send the current operation instruction to the corresponding smart home appliance if there is no preset combination instruction.

According to a third aspect of the present disclosure, a non-transitory computer-readable storage medium is provided. The non-transitory computer-readable storage medium has stored therein instructions that, when executed by a processor of a terminal, causes the terminal to perform a method for controlling a smart home appliance, wherein the method includes: obtaining a current operation instruction; determining whether there is a preset combination instruction corresponding to the current operation instruction, wherein the preset combination instruction includes at least two operation instructions and operation information of the at least two operation instructions, and the operation information at least comprises a sequence between adjacent operation instructions and a delay between adjacent operation instructions; sending the at least two operation instructions in the preset combination instruction to a corresponding smart home appliance if there is the preset combination instruction and the preset combination instruction is selected; and sending the current operation instruction to the corresponding smart home appliance if there is no preset combination instruction.

The technical solutions provided by embodiments of the present disclosure have the following advantages.

After the current operation instruction is inputted by a user, by determining whether there is the preset combination instruction corresponding to the current operation instruction, operation instructions in the preset combination instruction are sent directly to the corresponding smart home appliance if there is the preset combination instruction and the preset combination instruction is selected.

When using the method for controlling a smart home appliance, the user only needs to input one operation instruction or a few operation instructions (the number of the input operation instructions is less than the number of all operation instructions required to implement a certain function), all operation instructions in the preset combination instruction can be sent out automatically, thus the user is not required to input all operation instructions in the preset combination instruction once or more again. Therefore, a wait time for inputting all operation instructions can be saved, the operation of the smart home appliance can be less difficult, and the control for the smart home appliance can be more convenient and easier.

It would be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings wherein the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
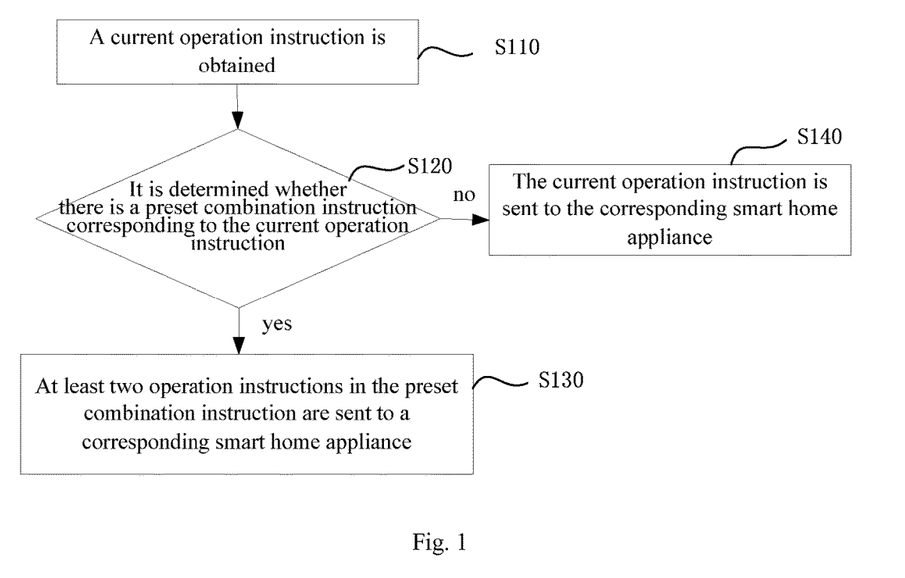
FIG. 1 is a flow chart illustrating a method for controlling a smart home appliance according to an exemplary embodiment of the present disclosure.

FIG. 1 is the flow chart of a method for controlling a smart home appliance according to an exemplary embodiment of the present disclosure. Referring to FIG. 1, the method for controlling a smart home appliance may be used in a smart home appliance or a terminal device, and the method includes the following steps.

In step S110, a current operation instruction is obtained.

The operation instruction refers to an instruction for controlling the smart home appliance. For different smart home appliances, their operation instructions are not the same. For example, for a smart TV, the operation instructions include but are not limited to a turn on instruction, a turn off instruction, a channel switching instruction and a volume adjusting instruction. For a smart air conditioner, the operation instructions include but are not limited to a power on instruction, a power off instruction, a temperature adjusting instruction and a mode switching instruction.

When obtaining the current operation instruction, the operation instruction inputted by a user can be obtained by local input. The local input refers to obtaining the operation instruction inputted via local buttons of the smart home appliance. In addition, the operation instruction may be received from another terminal device such as a mobile phone, a smart home console (i.e. a wireless console, for example, an infrared signal transmitting device) and so on.

In step S120, it is determined whether there is a preset combination instruction corresponding to the current operation instruction.

In an exemplary embodiment of the present disclosure, there are a plurality of preset combination instructions, and each preset combination instruction includes at least two operation instructions and operation information of the at least two operation instructions. The operation information includes a sequence between adjacent operation instructions contained in the preset combination instruction, and a delay between adjacent operation instructions contained in the preset combination instruction. In addition, the operation information can also include other information in addition to the sequence and the delay.

The preset combination instruction refers to a combination consisting of a plurality of operation instructions which are preset by the user. For example, when a TV is in a standby state, if the user needs to watch the news channel (CCTV13) having a channel number 13, the user usually needs to click on a "standby/on" button, then click on a "number 1" button and a "number 3" button sequentially after turning on the TV. For the users using set-top boxes, a main menu interface may be displayed after turning on the TV, the user needs to click on an "exit" button and then click on the "number 1" button and the "number 3" button sequentially. In this condition, a sequence of a plurality of buttons needed to be clicked on to switch the TV from the standby state directly to the news channel CCTV13 may be recorded as a combination instruction. For example, the "standby/on" button→the "number 1" button→the "number 3" button can be recorded as the combination instruction, or the "standby/on" button→the "exit" button→the "number 1" button→the "number 3" button can be recorded as the combination instruction. If it is required to enter into the news channel CCTV13 from the standby state directly, the corresponding preset combination instruction can be selected.

The delay between adjacent operation instructions in the operation information may be related to a response time of a TV, for example, after the user clicks on the "standby/on" button, it takes the TV 1 to 3 seconds to enter into the turning on state from the standby state. If the delay between adjacent operation instructions is not recorded in the preset combination instruction, it may occur that the operation instructions in the preset combination instruction are executed within three seconds but the TV has not yet be turned on, or a channel with a channel number 1 may be entered because the duration between clicking on the "number 1" button and clicking on the "number 3" button is relatively longer. Therefore, the delay between adjacent operation instructions may be contained in the operation information of the preset combination instruction.

In step S130, the at least two operation instructions in the preset combination instruction are sent to a corresponding smart home appliance if there is the preset combination instruction and the preset combination instruction is selected.

When the method is used in a terminal device, the terminal device can directly transmit a wireless signal identifiable by the smart home appliance. In some embodiments, the terminal device is provided with a wireless signal transmission module, and the terminal device may also send the preset combination instruction to the wireless console such as an infrared signal console used for controlling a plurality of smart home appliances inside a house, and then the wireless console converts the preset combination instruction into a wireless signal and sends the wireless signal to the smart home appliance.

When the method is used in a smart home appliance, the method can be performed in a processor of the smart home appliance. The processor can receive the current operation instruction via a wireless receiving module. The at least two operation instructions in the preset combination instruction may be converted into a control signal at step S130 after analyzed by the processor, and then the control signal may be sent to the smart home appliance via an electric circuit.

In step S140, the current operation instruction is sent to the corresponding smart home appliance if there is no preset combination instruction.

If there is no preset combination instruction, i.e. the current operation instruction is not predefined, the current operation instruction can be sent to the smart home appliance, which is similar to a manner of controlling the smart home appliance using a remote controller.

With the method for controlling a smart home appliance according to embodiments of the present disclosure, after the current operation instruction is inputted by the user, by determining whether there is the preset combination instruction corresponding to the current operation instruction, operation instructions in the preset combination instruction are sent directly to the corresponding smart home appliance if there is the preset combination instruction and the preset combination instruction is selected.

When using the method for controlling a smart home appliance, the user only needs to input one operation instruction or a few operation instructions (the number of the operation instructions is less than the number of all operation instructions required to implement a certain function), all operation instructions in the preset combination instruction can be sent automatically, thus the user is not required to input all operation instructions in the preset combination instruction once or more again. Therefore, a wait time for inputting all operation instructions repeatedly can be saved, the operation of the smart home appliance can be less difficult, and the control for the smart home appliance can be more convenient and easier.

Figure 2:
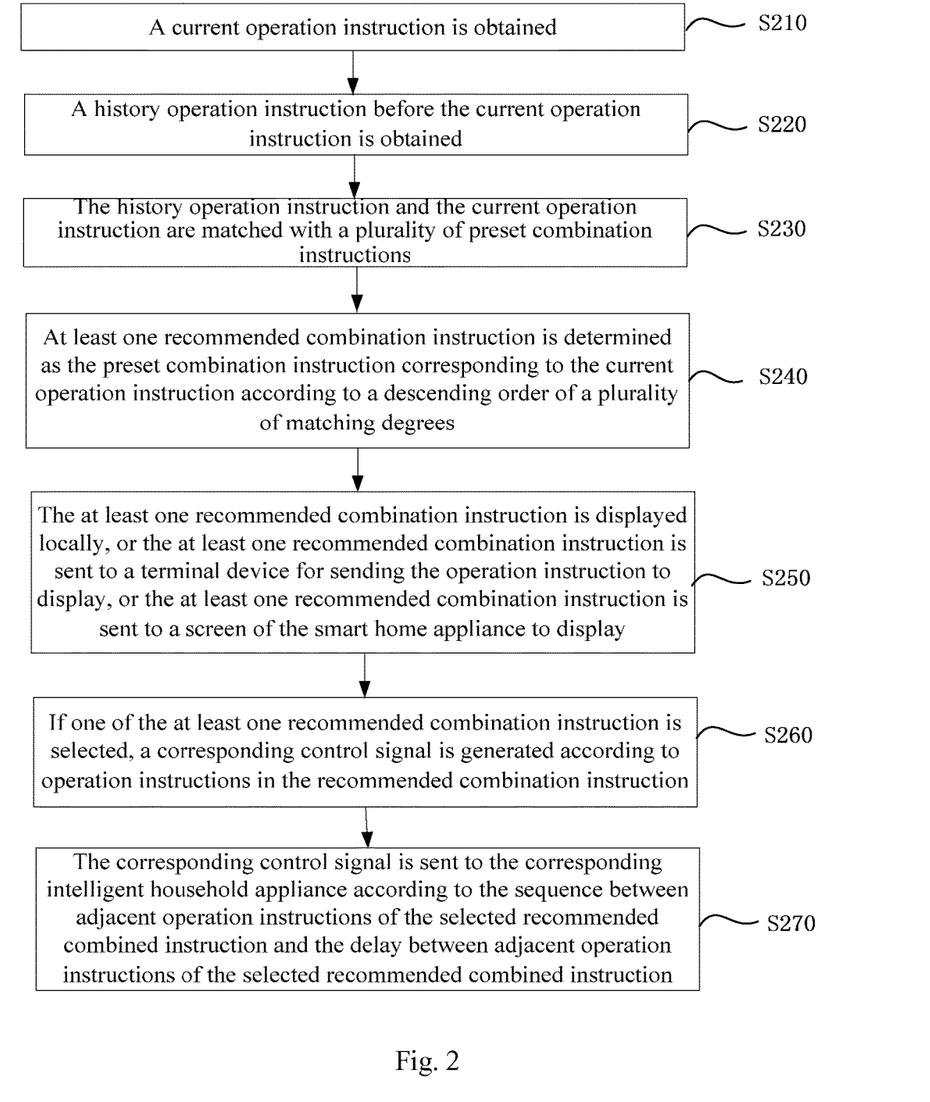
FIG. 2 is a flow chart illustrating a method for controlling a smart home appliance according to an exemplary embodiment of the present disclosure.

FIG. 2 is the flow chart of a method for controlling a smart home appliance according to an exemplary embodiment of the present disclosure. Referring to FIG. 2, the method includes the following steps.

In step S210, a current operation instruction is obtained.

In step S220, a history operation instruction before the current operation instruction is obtained.

When the user inputs one operation instruction, the intention of the user for this operation may not be determined based on the single operation instruction, but may be substantially determined based on two or more operation instructions. For example, if the current operation instruction inputted by the user is clicking on the "number 3" button, the intention of the user may be determined according to the "number 3" button. However, if the history operation instruction before clicking on the "number 3" button is clicking on the "standby/on" button and the "number 1" button sequentially, the intention of the user for this operation may be determined as selecting a channel for display.

In step S230, the history operation instruction and the current operation instruction are matched with a plurality of preset combination instructions.

During the matching process, the history operation instruction and the current operation instruction can be matched with all operation instructions in the preset combination instruction in sequence according to a sequence between the history operation instruction and the current operation instruction and a delay between the history operation instruction and the current operation instruction, etc. The matching may be a fuzzy matching, for example, the sequence between the operation instructions has the highest priority, so the sequential current operation instruction and history operation instruction may be considered as matched with a preset combination instruction if their sequences are identical while the delay between two adjacent operation instructions may be ignored or of less importance.

In step S240, at least one recommended combination instruction is determined as the preset combination instruction corresponding to the current operation instruction according to a descending order of a plurality of matching degrees.

The plurality of matching degrees are determined according to a plurality of first matching degrees of the current operation instruction and a plurality of second matching degrees of the history operation instruction.

The matching degree can be determined according to priorities of the sequence between operation instructions and the delay between adjacent operation instructions. For example, the priority of the sequence between operation instructions can be higher than the priority of the delay between adjacent operation instructions. Thus, during the matching process, the history operation instruction and the current operation instruction are matched with all preset combination instructions in chronological order according to the sequence between the history operation instruction and the current operation instruction, and at least one recommended combination instruction can be determined according to the descending order of the plurality of matching degrees.

For example, the history operation instructions include clicking on the "standby/on" button and the "exit" button successively, and the current operation instruction is clicking on the "number 1" button. Accordingly, the at least one recommended combination instruction may be: 1) the "standby/on" button→the "exit" button→"number 1" button (selecting the channel of Channel No. 1); 2) the "standby/on" button→the "exit" button→the "number 1" button→any one button from the "number 0" button to the "number 9" button (selecting the channel of any of Channel Nos. 10-19); 3) the "standby/on" button→the "exit" button→the "number 1" button→any one button from the "number 0" button to the "number 9" button→any one button from the "number 0" button to the "number 9" button (selecting the channel of any of Channel Nos. 100-199).

Among the aforementioned recommended combination instructions, the matching degree of recommended combination instruction 1), the matching degree of recommended combination instruction 2) and the matching degree of recommended combination instruction 3) are in a descending order. Among the recommended combination instructions of the same type, priorities can be set according to their numerical value. For example, if the first buttons have the same number, the priority of the second button having a smaller number can be higher than the priority of the second button having a larger number. The corresponding actual condition can be that the priority of the recommended combination instruction corresponding to Channel No. 100 is higher than the priority of the recommended combination instruction corresponding to Channel No. 105.

The number of recommended combination instructions can be free set by the user according to actual needs. For example, the number of recommended combination instructions can be the number of displayable recommended combination instructions, or the number of recommended combination instructions can be set as constant value. For example, five recommended combination instructions can be displayed every time, and if the number of recommended combination instructions is less than five, all recommended combination instructions can be displayed.

In step S250, the at least one recommended combination instruction is displayed locally, or the at least one recommended combination instruction is sent to a terminal device configured to send the operation instruction to display, or the at least one recommended combination instruction is sent to a screen of the smart home appliance to display.

After being determined, the at least one recommended combination instruction can be displayed locally, or the at least one recommended combination instruction can be sent to the terminal device to display. The terminal device is used to send the operation instruction. For example, the at least one recommended combination instruction can be displayed directly on a terminal device such as a mobile phone by which the user uses to input the operation instruction, thus facilitating the user to understand the at least one recommended combination instruction in time. Alternatively, the at least one recommended combination instruction can be sent to the screen of the smart home appliance, so that the user can know the at least one recommended combination instruction easily by observing the screen.

In step S260, if one of the at least one recommended combination instruction is selected, a corresponding control signal is generated according to the operation instructions in the one recommended combination instruction.

In step S270, the corresponding control signal is sent to the corresponding smart home appliance according to the sequence between adjacent operation instructions of the selected recommended combination instruction and the delay between adjacent operation instructions of the selected recommended combination instruction.

In an exemplary embodiment of the present disclosure, according to the obtained history operation instruction and the obtained current operation instruction, the method can recommend automatically the recommended combination instruction which is similar to the history operation instruction and the current operation instruction according to the plurality of matching degrees, i.e. the method has a fuzzy recommendation function. Thus, the user can select one from the at least one recommended combination instruction which is displayed, and then the operation instructions in the selected recommended combination instruction can be executed automatically. The method for controlling a smart home appliance can perform fuzzy recommendation according to the obtained operation instruction, so that the user does not need to remember all preset combination instructions and the at least one recommended combination instruction can be provided to the user according to a portion of the operation instructions inputted by the user according to actual needs, and thus the control for the smart home appliance can be simpler, more convenient and smart.

Figure 3:
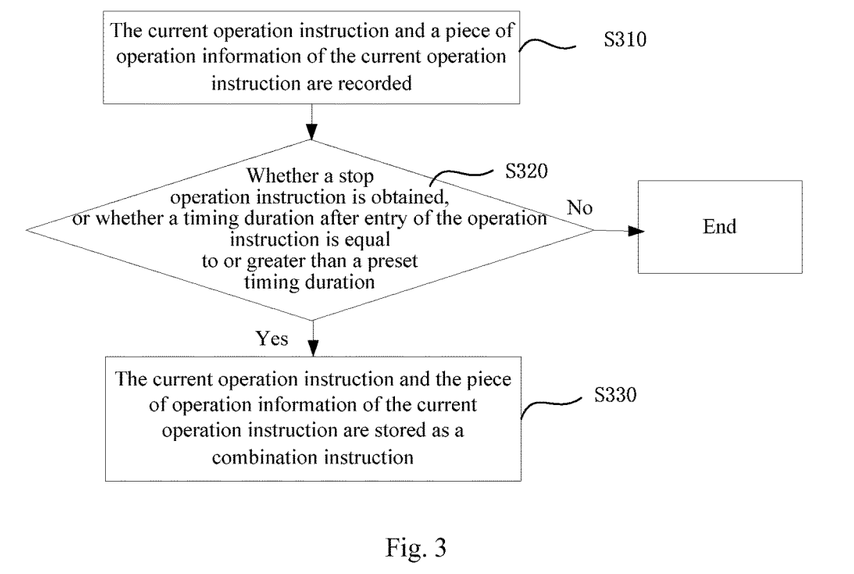
FIG. 3 is a flow chart illustrating a method for controlling a smart home appliance according to an exemplary embodiment of the present disclosure.

In an exemplary embodiment of the present disclosure, if it is determined that there is no preset combination instruction at step S120 or step S260, the method for controlling the smart home appliance further includes the following step, as shown in FIG. 3.

In step S310, the current operation instruction and operation information of the current operation instruction are recorded.

If it is determined that there is no preset combination instruction for each determination, the current operation instruction and the operation information of the current operation instruction may be recorded.

In an embodiment of the present disclosure, after step S310, as shown in FIG. 3, the method for controlling the smart home appliance further includes the following step.

In step S320, it is determined whether a stop operation instruction is obtained, or whether a timing duration after the entry of the operation instruction is equal to or greater than a preset timing duration.

In an embodiment of the present disclosure, the user can enter into a combination instruction inputting interface by using a terminal device, a remote controller, or buttons on the smart TV. In other words, the user can sequentially input all operation instructions required for selecting an item (for example, switching to a certain channel), and at the end the user can input the stop operation instruction to indicate the end of recording this combination instruction. Alternatively, when recording the combination instruction, the inputted operation instructions can be sent to the smart home appliance in real time, so as to assist the user to confirm correctness of the recorded combination instruction.

Another embodiment will be described as follows. The user can input the operation instruction by using the terminal device, the remote controller, or the buttons on the smart TV to control the smart home appliance, and after finishing a selection, the user does not input any operation instruction. The timing starts at the end of entry of operation instructions. It is determined that the selection process ends if the timing duration after the end of the operation instruction is equal to or greater than the preset timing duration.

In step S330, if the stop operation instruction is obtained, or if the timing duration after the end of the operation instruction is equal to or greater than the preset timing duration, the current operation instruction and the operation information of the current operation instruction are saved as a combination instruction, otherwise, the flow is over.

Figure 4:
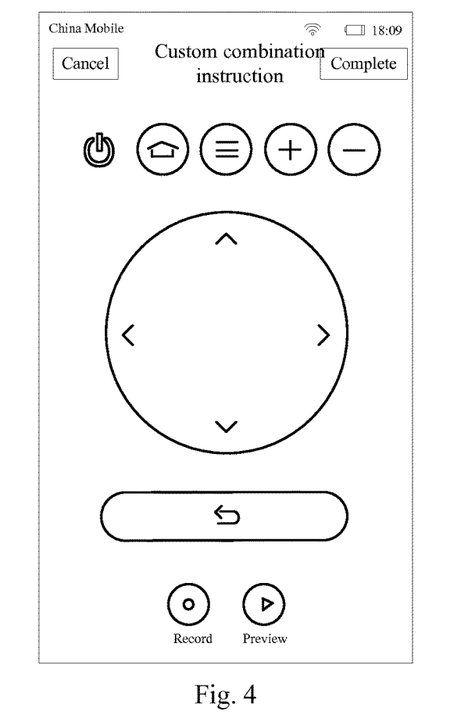
FIG. 4 is a schematic diagram illustrating a display interface of a terminal device according to an exemplary embodiment of the present disclosure.

In an exemplary embodiment of the present disclosure, as shown in FIG. 4, an application (APP) may be installed in the terminal device, which displays a virtual interface of visual buttons corresponding to real buttons on the remote controller and frequently-used buttons on the remote controller can be shown on the virtual interface. The user can click on a virtual button on the virtual interface to input the operation instruction, and then the operation instruction can be sent to the smart home appliance by an infrared signal transmitter in the terminal device, or via network (e.g. a router).

Figure 5:
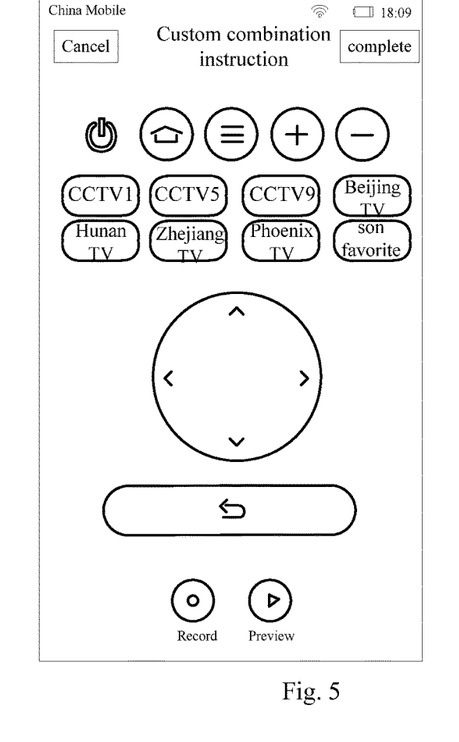
FIG. 5 is a flow chart illustrating a method for controlling a smart home appliance according to an exemplary embodiment of the present disclosure.

In practical applications, the user can input different preset combination instructions in advance according to actual needs, and a control corresponding to the preset combination instruction can be set on the virtual interface of the terminal. As shown in FIG. 5, eight preset combination instructions are disposed on the virtual interface, i.e. CCTV1, CCTV5, CCTV9, Beijing TV, Hunan TV, Zhejiang TV, Phoenix TV and son's favorite channels. The name of the control is usually corresponding to the name of the TV channel. In some embodiments, the name of the control (as shown in FIG. 5, the "son favorite" can be as the name of the channel) can be inputted manually.

In an exemplary embodiment of the present disclosure, because the number of the controls that can be shown on the terminal interface may be limited, a drop-down menu can be used to hide a plurality of preset combination instructions, and a combined control can be arranged. Therefore, if the user clicks on the combined control, the plurality of preset combination instructions can be displayed in form of a list or in other forms, thus facilitating the user to make selections.

Figure 6:
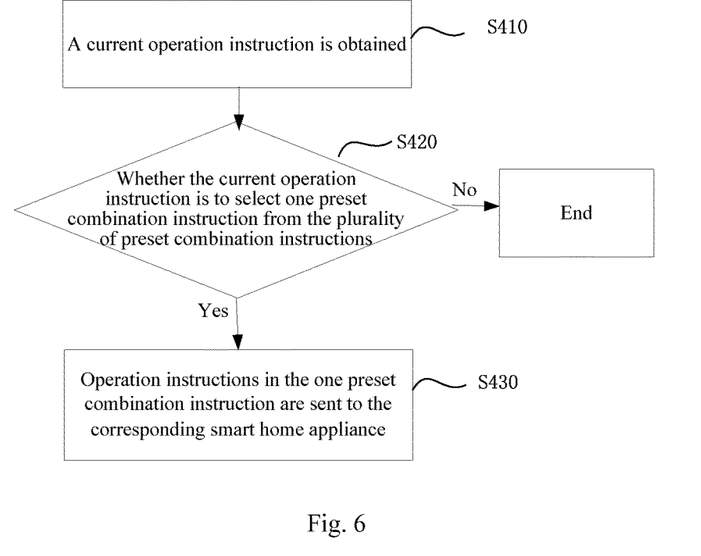
FIG. 6 is another schematic diagram illustrating a display interface of a terminal device according to an exemplary embodiment of the present disclosure.

With reference to FIG. 6, a method for controlling a smart home appliance according to an embodiment of the present disclosure is provided. Referring to FIG. 6, the method includes the following steps.

In step S410, a current operation instruction is obtained.

The current operation instruction refers to the operation for a plurality of controls corresponding to the plurality of preset combination instructions shown in FIG. 5 made by the user.

In step S420, it is determined whether the current operation instruction is to select one preset combination instruction from the plurality of preset combination instructions.

In step S430, if the current operation instruction is to select one preset combination instruction from the plurality of preset combination instructions, operation instructions in the selected preset combination instruction are sent to the corresponding smart home appliance; otherwise, the flow ends.

The method for controlling a smart home appliance according to embodiments of the present disclosure will be described in the following with reference to specific scenarios.

Scenario 1

Figure 7:
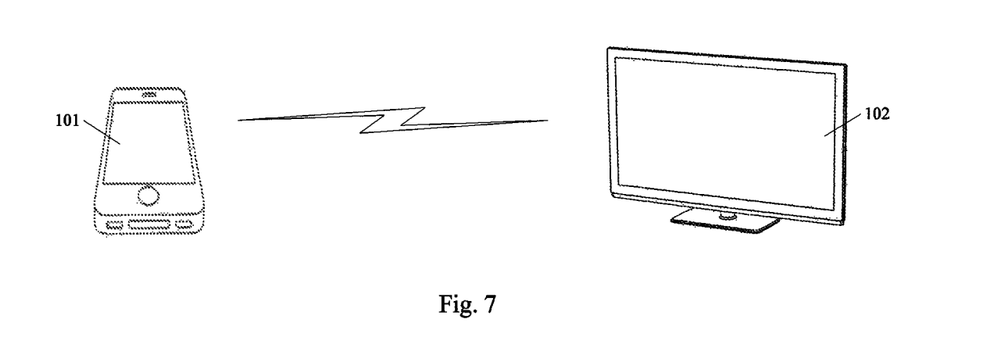
FIG. 7 is a schematic diagram illustrating a scenario according to an exemplary embodiment of the present disclosure.

Referring to FIG. 7, which is a schematic diagram of a scenario of a smart home appliance according to embodiments of the present disclosure. As shown in FIG. 7, the smart home appliance includes a terminal device 101 (e.g., a mobile phone as shown in FIG. 7, or a tablet PC, a computer, etc.) and a smart TV 102. In some embodiments, the smart TV 102 can be a TV (or other home appliance such as a refrigerator, an air conditioner, etc.), and an infrared signal transmitting module for controlling the smart TV 102 can be provided in the terminal 101.

For scenario 1, the method for controlling a smart TV includes the following steps.

In step a1, a terminal device receives a current operation instruction inputted by a user.

In step a2, the terminal device determines whether there is a preset combination instruction corresponding to the current operation instruction.

For a particular family member, the preset combination instruction can be stored in his or her terminal device. For example, the preset combination instruction can be stored in the terminal device in a manner such as keying in.

In addition, as shown in FIG. 4, an APP can be further provided in the terminal device, which is configured to display a virtual interface including virtual buttons corresponding to real buttons on the remote controller, and frequently-used buttons on the remote controller can be shown on the virtual interface. The user can click on the virtual button on the virtual interface to input the operation instruction, and then the terminal device can convert the operation instruction into an infrared signal and send the infrared signal to the smart TV.

In step a3, operation instructions in the preset combination instruction are sent to the smart TV if there is the preset combination instruction and the preset combination instruction is selected.

In step a4, the current operation instruction is sent to the smart TV if there is no preset combination instruction.

Scenario 2

Figure 8:
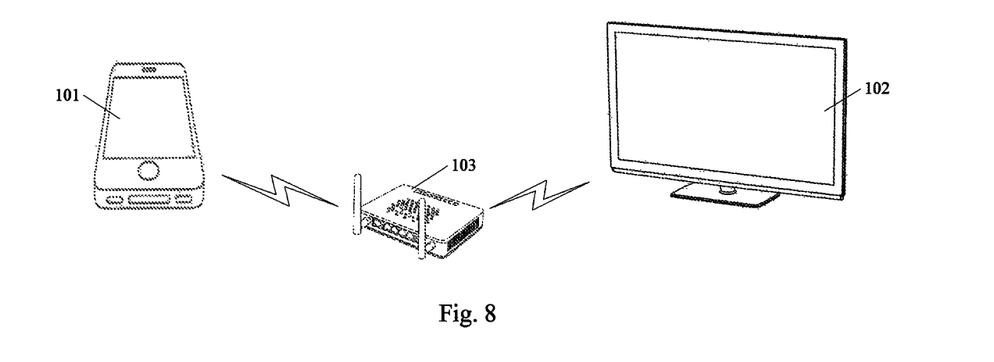
FIG. 8 is a schematic diagram illustrating another scenario according to an exemplary embodiment of the present disclosure.

Referring to FIG. 8, which is a schematic diagram of another scenario of a smart home appliance according to embodiments of the present disclosure. As shown in FIG. 8, the smart home appliance includes a terminal device 101 (for example, a mobile phone shown in FIG. 8, or a tablet PC, a computer, etc.), a smart TV 102 and a router 103. In some embodiments, the smart TV 102 can be connected to a network.

For scenario 2, steps of the method for controlling a smart home appliance are substantially the same as those in scenario 1, with the exception that the operation instruction is transmitted from the terminal device 101 to the smart TV 102 via the router 103 instead of transmitted from the terminal 101 to the smarter TV 102 directly.

As described in scenario 1, for the particular family member, the preset combination instruction can be stored in the terminal device 101. In the present condition, for a non-family member, if it is required to control the smart TV through a terminal device, the preset combination instruction can be stored in the router 103, so that the preset combination instruction can be downloaded from the router 103 if the terminal device 101 of the non-family member is connected to the router 103. In addition, storing the preset combination instruction with the router 103 is suitable for public places, for example, hotel room, bar and other places with relatively greater mobility.

Scenario 3

In scenario 1, a particular terminal device may be needed in which the infrared signal transmitting module is disposed. In scenario 2, it is required that the smart TV is connected to the network. These scenarios may have a higher requirement on hardware, which restricts the application of the method of the disclosure. When the method is applied on the conventional equipments or devices, additional hardware modules may be needed and thus increase the cost.

Figure 9:
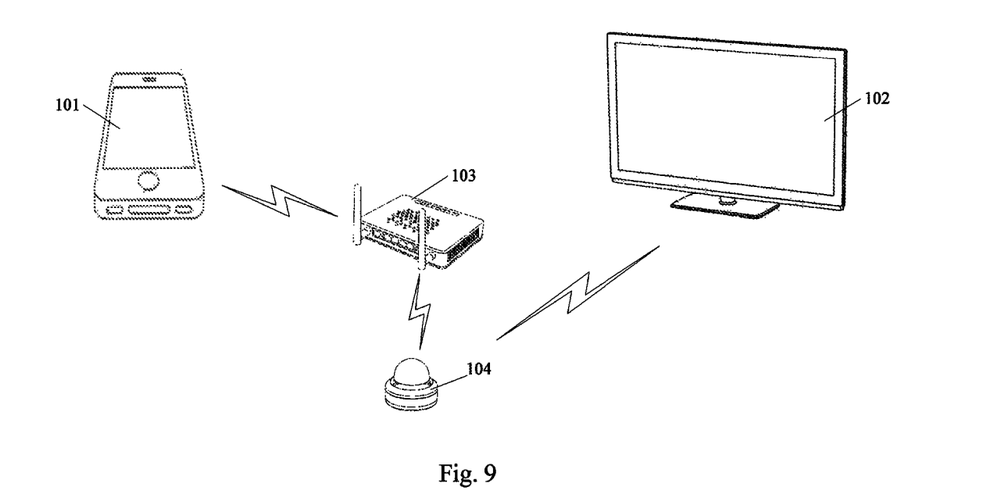
FIG. 9 is a schematic diagram illustrating yet another scenario according to an exemplary embodiment of the present disclosure.

Referring to FIG. 9, which is the schematic diagram of yet another condition of a smart home appliance according to embodiments of the present disclosure. As shown in FIG. 9, the smart home appliance includes a terminal device 101 (e.g., a mobile phone shown in FIG. 9, or a tablet PC, a computer, etc.), the smart TV 102, a router 103 and a wireless console 104. In some embodiments, the smart TV 102 can be a conventional TV. The wireless console 104 can exchange data with the router 103 via wireless communication or wired communication, and receive the operation instruction sent from the terminal device 101 or the router 103. The wireless console 104 can convert the operation instruction into a signal identifiable by the smart home appliance such as an infrared signal, and then send the signal to the smart home appliance 102.

As technology develops, more and more smart home appliances occur. In order to manage the smart home appliances easily, the wireless console 104 can be arranged in the house, which is used to send a plurality of wireless signals including the infrared signal. For the terminal devices include no infrared signal transmitting module, the smart TV may be controlled via the wireless console 104.

For scenario 3, steps of the method for controlling a smart home appliance may be substantially the same as those in scenario 1, with the exception that the terminal device 101 does not send the operation instruction directly to the smart TV 102, instead, it sends the operation instruction to the wireless console 104 via the router 103. Then the wireless console 104 converts the operation instruction into the infrared signal and sends the infrared signal to the smart TV 102.

As described in scenario 3, with the method according to embodiments of the present disclosure, the user can use a conventional mobile phone to control the conventional TV through the wireless console 104. Therefore, the application of the smart home appliance can be relatively wide.

Scenario 4

In scenario 4, a processor for receiving the operation instruction may be further disposed in the smart TV 102, and the terminal device 101 may be a conventional remote controller. In scenario 4, the method for controlling a smart TV includes the following steps.

In step b1, a processor receives a current operation instruction inputted by a user.

The processor can use a wireless receiving module such as an infrared receiving module included in the smart TV to receive the operation instruction.

In step b2, the processor determines whether there is the preset combination instruction corresponding to the current operation instruction.

Analysis process of the operation instruction is performed by the processor in the smart TV, so that the preset combination instruction can be stored in the processor of the smart TV.

In step b3, the processor sends the operation instructions in the preset combination instruction to the smart TV, if there is the preset combination instruction and the preset combination instruction is selected.

The processor is connected to the smart TV via an electric circuit, and the processor may convert the operation instruction into an electrical signal and then send the electrical signal to the smart TV.

In step b4, the processor sends the current operation instruction to the smart TV, if there is no preset combination instruction.

Figure 10:
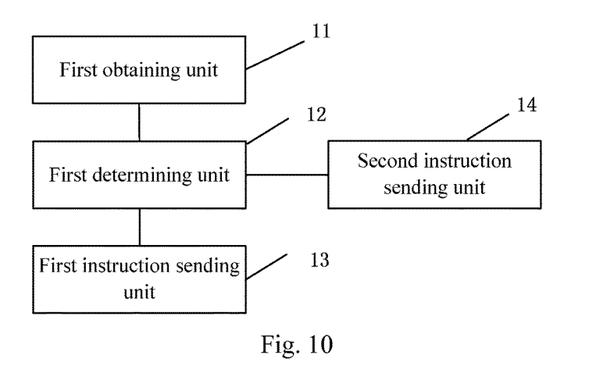
FIG. 10 is a block diagram illustrating an apparatus for controlling a smart home appliance according to an exemplary embodiment of the present disclosure.

FIG. 10 is the block diagram of an apparatus for controlling a smart home appliance according to an exemplary embodiment of the present disclosure. Referring to FIG. 10, the apparatus includes a first obtaining unit 11, a first determining unit 12, a first instruction sending unit 13 and a second instruction sending unit 14.

The first obtaining unit 11 is configured to obtain a current operation instruction.

The first determining unit 12 is configured to determine whether there is a preset combination instruction corresponding to the current operation instruction, wherein the preset combination instruction includes at least two operation instructions and operation information of the at least two operation instructions, and the operation information at least includes a sequence between adjacent operation instructions and a delay between adjacent operation instructions.

The first instruction sending unit 13 is configured to send the at least two operation instructions in the preset combination instruction to a corresponding smart home appliance if there is the preset combination instruction and the preset combination instruction is selected.

The second instruction sending unit 14 is configured to send the current operation instruction to the corresponding smart home appliance if there is no preset combination instruction.

In an exemplary embodiment of the present disclosure, the apparatus further includes a second determining unit and a third instruction sending unit.

The second determining unit is configured to determine whether the current operation instruction is to select one preset combination instruction from a plurality of preset combination instructions.

The third instruction sending unit is configured to send operation instructions in the one preset combination instruction to the corresponding smart home appliance, if the current operation instruction is to select one preset combination instruction from a plurality of preset combination instructions.

In an exemplary embodiment of the present disclosure, the first obtaining unit 11 includes a local input subunit and a receiving subunit.

The local input subunit is configured to obtain an operation instruction inputted locally.

The receiving subunit is configured to receive an operation instruction sent by another terminal.

In an embodiment of the present disclosure, the first determining unit 12 includes a second obtaining subunit, a matching subunit, a determining subunit and a display subunit.

The second obtaining subunit is configured to obtain a history operation instruction before the current operation instruction.

The matching subunit is configured to match the history operation instruction and the current operation instruction with a plurality of preset combination instructions.

The determining subunit is configured to determine at least one recommended combination instruction as the preset combination instruction corresponding to the current operation instruction according to a descending order of a plurality of matching degrees, wherein the plurality of matching degrees are determined according to a plurality of first matching degrees of the current operation instruction and a plurality of second matching degrees of the history operation instruction.

The display subunit is configured to display the at least one recommended combination instruction local locally, or send the at least one recommended combination instruction to a terminal configured to send the operation instruction to display, or send the at least one recommended combination instruction to a screen of the smart home appliance to display. The first instruction sending unit 13 can send operation instructions in any of the at least one recommended combination instruction displayed by the displaying subunit to the smart home appliance, if the recommended combination instruction is selected.

In an exemplary embodiment of the present disclosure, the apparatus further includes a recording unit.

The recording unit is configured to record the current operation instruction and operation information of the current operation instruction, if there is no preset combination instruction.

In an embodiment of the present disclosure, the apparatus further includes a third determining unit and a combination instruction storing unit in addition to the recording unit.

The third determining unit is configured to determine whether a stop operation instruction is obtained, or whether a timing duration after the end of the operation instruction is equal to or greater than a preset timing duration.

The combination instruction storing unit is configured to store the current operation instruction and the operation information of the current operation instruction as one combination instruction, if the stop operation instruction is obtained, or if the timing duration after the end of the operation instruction is equal to or greater than the preset timing duration.

In an exemplary embodiment of the present disclosure, the first instruction sending unit, the second instruction sending unit, or the third instruction sending unit may each include a control signal generating subunit and a signal sending subunit.

The control signal generating subunit is configured to generate a control signal corresponding to operation instructions in the present combination instruction or corresponding to the current operation instruction.

The signal sending subunit is configured to send the control signal to the corresponding smart home appliance according to the sequence between adjacent operation instructions and the delay between adjacent operation instructions.

For the apparatus in the above-described embodiments, specific operation manner of each module have been described in detail in the method embodiments, which will not be elaborated herein.

Figure 11:
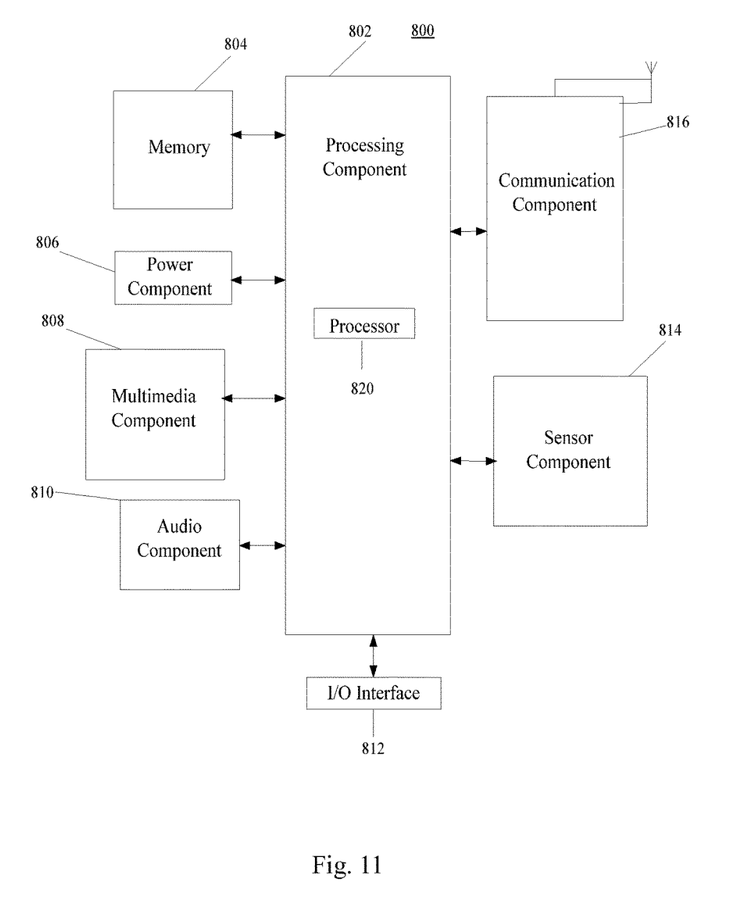
FIG. 11 is a block diagram illustrating a terminal device for controlling a smart home appliance according to an exemplary embodiment of the present disclosure.

FIG. 11 is a block diagram of a terminal device 800 for controlling a smart home appliance according to an embodiment of the present disclosure. For example, the terminal device 800 may be a mobile phone, a computer, a digital broadcast terminal, a message receiving and sending device, a game console, a tablet device, a medical device, exercise equipment, a personal digital assistant, and the like.

Referring to FIG. 11, the terminal device 800 may include one or more of the following components: a processing component 802, a memory 804, a power component 806, a multimedia component 808, an audio component 810, an input/output (I/O) interface 812, a sensor component 814 and a communication component 816.

The processing component 802 is generally configured to control overall operations of the terminal device 800, such as the operations associated with display, telephone calls, data communications, camera operations, and recording operations. The processing component 802 may include one or more processors 820 to execute instructions so as to perform all or a part of the steps in the above described methods. Moreover, the processing component 802 may include one or more modules, thus facilitating the interaction between the processing component 802 and other components. For instance, the processing component 802 may include a multimedia module, thus facilitating the interaction between the multimedia component 808 and the processing component 802.

The memory 804 is configured to store various types of data to support the operation of the terminal device 800. Examples of such data include instructions for any applications or methods operated on the terminal device 800, contact data, phonebook data, messages, pictures, videos, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 is configured to provide power to various components of the terminal device 800. The power component 806 may include a power management system, one or more power sources, and other components associated with the generation, management, and distribution of power for the terminal device 800.

The multimedia component 808 may include a screen configured to provide an output interface between the terminal device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum when the terminal device 800 is in an operation mode such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the terminal device 800 is in an operation mode, such as a calling mode, a recording mode, and a voice recognition mode. The received audio signal may be further stored in the memory 804 or transmitted via the communication component 816. In some embodiments, the audio component 810 further includes a loud speaker to output audio signals.

The I/O interface 812 is configured to provide an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal device 800. For instance, the sensor component 814 may detect an on/off status of the terminal device 800, relative positioning of components, e.g., a display screen and a keypad of the terminal device 800. The sensor component 814 may further detect a change in position of the terminal device 800 or a component of the terminal device 800, a presence or absence of contact between the user and the terminal device 800, an orientation or an acceleration/deceleration of the terminal device 800, and a change in temperature of the terminal device 800. The sensor component 814 may include a proximity sensor configured to detect the presence of nearby objects without any physical contact. The sensor component 814 may further include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate a wire or wireless communication between the terminal device 800 and other terminal devices. The terminal device 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a bluetooth (BT) technology, or other technologies.

In exemplary embodiments, the terminal device 800 may be implemented with one or more electronic elements such as application specific integrated circuits (ASIC), digital signal processors (DSP), digital signal processing devices (DSPD), programmable logic devices (PLD), field programmable gate arrays (FPGA), controllers, micro-controllers, microprocessors, or other electronic components, for performing the above described methods.

In exemplary embodiments, there is further provided a non-transitory computer readable storage medium including instructions, such as the memory 804 including instructions executable by the processor 820 in the terminal device 800 to perform the above-described methods. For example, the non-transitory computer-readable storage medium may be a ROM, a RAM, a CD-ROM, a magnetic tape, a floppy disc, an optical data storage device, and the like.

A non-transitory computer readable storage medium is provided. When instructions in the non-transitory computer readable storage medium are executed by a processor of a mobile terminal, the mobile terminal can execute a method for controlling a smart home appliance. The method includes: obtaining a current operation instruction; determining whether there is a preset combination instruction corresponding to the current operation instruction, wherein the preset combination instruction comprises at least two operation instructions and operation information of the at least two operation instructions, and the operation information at least comprises a sequence between adjacent operation instructions and a delay between adjacent operation instructions; sending the at least two operation instructions in the preset combination instruction to a corresponding smart home appliance if there is the preset combination instruction and the preset combination instruction is selected; and sending the current operation instruction to the corresponding smart home appliance if there is no preset combination instruction.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for controlling a smart home appliance, comprising:
    obtaining, by a processor of a terminal device or the smart home appliance, a current operation instruction;
    determining, by the processor, whether there is a preset combination instruction corresponding to the current operation instruction comprising:
        obtaining, by the processor, a history operation instruction before the current operation instruction;
        matching, by the processor, the history operation instruction and the current operation instruction with a plurality of preset combination instructions;
        determining, by the processor, at least one recommended combination instruction as the preset combination instruction corresponding to the current operation instruction according to a descending order of a plurality of matching degrees, wherein the plurality of matching degrees are determined according to a plurality of first matching degrees between the current operation instruction and the preset combination instructions and a plurality of second matching degrees between the history operation instruction and the preset combination instructions; and
    displaying, by the processor, the at least one recommended combination instruction locally, or sending the at least one recommended combination instruction to a terminal device configured to send the operation instruction to display, or sending the at least one recommended combination instruction to a screen of the smart home appliance to display;
    wherein the preset combination instruction comprises at least two operation instructions and operation information of the at least two operation instructions, and the operation information at least comprises a sequence between adjacent operation instructions and a delay between adjacent operation instructions;
    controlling, by the processor, the smart home appliance according to the operation instructions in the preset combination instruction and the operation information of the operation instructions if there is the preset combination instruction and the preset combination instruction is selected; and
    controlling, by the processor, the smart home appliance according to the current operation instruction if there is no preset combination instruction.

2. The method according to claim 1, wherein if the current operation instruction is to select one preset combination instruction from a plurality of preset combination instructions, the method further comprises:
    sending, by the processor, operation instructions in the one preset combination instruction to the smart home appliance.

3. The method according to claim 1, wherein obtaining, by the processor, the current operation instruction comprises:
    obtaining, by the processor, an operation instruction inputted locally.

4. The method according to claim 1, wherein obtaining, by the processor, the current operation instruction comprises:
    receiving, by the processor, an operation instruction sent by another terminal device.

5. The method according to claim 1, further comprising:
    recording, by the processor, the current operation instruction and operation information of the current operation instruction, if there is no preset combination instruction.

6. The method according to claim 5, further comprising:
    determining, by the processor, whether a stop operation instruction is obtained; and
    saving, by the processor, the current operation instruction and the operation information of the current operation instruction as one combination instruction, if the stop operation instruction is obtained.

7. The method according to claim 5, further comprising:
    determining, by the processor, whether a time duration after an end of the operation instruction is equal to or greater than a preset time duration; and
    saving, by the processor, the current operation instruction and the operation information of the current operation instruction as one combination instruction, if the time duration after the end of the operation instruction is equal to or greater than the preset timing duration.

8. The method according to claim 1, wherein controlling, by the processor, the smart home appliance according to the operation instructions in the preset combination instruction and the operation information of the operation instructions if there is the preset combination instruction and the preset combination instruction is selected comprises:
  generating, by the processor, a control signal corresponding to the operation instructions in the present combination instruction;
  sending, by the processor, the control signal to the corresponding smart home appliance according to the sequence between adjacent operation instructions and the delay between adjacent operation instructions.

9. The method according to claim 1, wherein controlling, by the processor, the smart home appliance according to the current operation instruction if there is no preset combination instruction comprises:
  generating, by the processor, a control signal corresponding to the current operation instruction;
  sending, by the processor, the control signal to the corresponding smart home appliance according to the sequence between adjacent operation instructions and the delay between adjacent operation instructions.

10. A terminal device for controlling a home appliance, comprising:
  a processor;
  a memory, configured to store an executable instruction of the processor;
  wherein the processor is configured to perform:
  obtaining a current operation instruction;
  determining whether there is a preset combination instruction corresponding to the current operation instruction, comprising:
    obtaining, by the processor, a history operation instruction before the current operation instruction;
    matching, by the processor, the history operation instruction and the current operation instruction with a plurality of preset combination instructions;
    determining, by the processor, at least one recommended combination instruction as the preset combination instruction corresponding to the current operation instruction according to a descending order of a plurality of matching degrees, wherein the plurality of matching degrees are determined according to a plurality of first matching degrees between the current operation instruction and the preset combination instructions and a plurality of second matching degrees between the history operation instruction and the preset combination instructions; and
    displaying, by the processor, the at least one recommended combination instruction locally, or sending the at least one recommended combination instruction to a terminal device configured to send the operation instruction to display, or sending the at least one recommended combination instruction to a screen of the smart home appliance to display;
  wherein the preset combination instruction comprises at least two operation instructions and operation information of the at least two operation instructions, and the operation information at least comprises a sequence between adjacent operation instructions and a delay between adjacent operation instructions;
  controlling the smart home appliance according to the operation instructions in the preset combination instruction and the operation information of the operation instructions if there is the preset combination instruction and the preset combination instruction is selected; and
  controlling the smart home appliance according to the current operation instruction if there is no preset combination instruction.

11. The terminal device according to claim 10, wherein if the current operation instruction is to select one preset combination instruction from a plurality of preset combination instructions, the method further comprises:
  sending operation instructions in the one preset combination instruction to the corresponding smart home appliance.

12. The terminal device according to claim 10, wherein obtaining the current operation instruction comprises:
  obtaining an operation instruction inputted locally.

13. The terminal device according to claim 10, wherein obtaining the current operation instruction comprises:
  receiving an operation instruction sent by another terminal device.

14. The terminal device according to claim 10, wherein the processor is further configured to perform:
  recording the current operation instruction and operation information of the current operation instruction, if there is no preset combination instruction.

15. The terminal device according to claim 14, wherein the processor is further configured to perform:
  determining whether a stop operation instruction is obtained; and
  saving the current operation instruction and the operation information of the current operation instruction as one combination instruction, if the stop operation instruction is obtained.

16. The terminal device according to claim 14, wherein the processor is further configured to perform:
  determining whether a time duration after an end of the operation instruction is equal to or greater than a preset time duration; and
  saving the current operation instruction and the operation information of the current operation instruction as one combination instruction, if the time duration after the end of the operation instruction is equal to or greater than the preset timing duration.

17. The terminal device according to claim 10, wherein controlling the smart home appliance according to the operation instructions in the preset combination instruction and the operation information of the operation instructions if there is the preset combination instruction and the preset combination instruction is selected comprises:
  generating a control signal corresponding to the operation instructions in the present combination instruction;
  sending the control signal to the corresponding smart home appliance according to the sequence between adjacent operation instructions and the delay between adjacent operation instructions.

18. The terminal device according to claim 10, wherein controlling, by the processor, the smart home appliance according to the current operation instructions if there is no preset combination instruction comprises:
  generating a control signal corresponding to the current operation instruction;
  sending the control signal to the corresponding smart home appliance according to the sequence between adjacent operation instructions and the delay between adjacent operation instructions.

19. A non-transitory computer-readable storage medium having stored therein instructions that, when executed by a processor of a terminal device, causes the terminal device to perform a method for controlling a smart home appliance, wherein the method comprises:

obtaining a current operation instruction;
determining whether there is a preset combination instruction corresponding to the current operation instruction, comprising:
- obtaining, by the processor, a history operation instruction before the current operation instruction;
- matching, by the processor, the history operation instruction and the current operation instruction with a plurality of preset combination instructions;
- determining, by the processor, at least one recommended combination instruction as the preset combination instruction corresponding to the current operation instruction according to a descending order of a plurality of matching degrees, wherein the plurality of matching degrees are determined according to a plurality of first matching degrees between the current operation instruction and the preset combination instructions and a plurality of second matching degrees between the history operation instruction and the preset combination instructions; and
- displaying, by the processor, the at least one recommended combination instruction locally, or sending the at least one recommended combination instruction to a terminal device configured to send the operation instruction to display, or sending the at least one recommended combination instruction to a screen of the smart home appliance to display;

wherein the preset combination instruction comprises at least two operation instructions and operation information of the at least two operation instructions, and the operation information at least comprises a sequence between adjacent operation instructions and a delay between adjacent operation instructions;

controlling the smart home appliance according to the operation instructions in the preset combination instruction and the operation information of the operation instruction if there is the preset combination instruction and the preset combination instruction is selected; and controlling the smart home appliance according to the current operation instruction if there is no preset combination instruction.

* * * * *